United States Patent
Bruening et al.

(10) Patent No.: US 7,403,583 B1
(45) Date of Patent: Jul. 22, 2008

(54) SYSTEM AND METHOD FOR PREDICTIVE SYNCHRONIZATION FOR LOCATING INTERLEAVING FRAMES AND DEMODULATION TRAINING SEQUENCES

(75) Inventors: Kent R. Bruening, Sandy, UT (US); Zachary C. Bagley, Salt Lake City, UT (US); Vaughn L. Mower, Bountiful, UT (US)

(73) Assignee: L-3 Communications Corporation, New York, NY (US)

( * ) Notice: Subject to any disclaimer, the term of this patent is extended or adjusted under 35 U.S.C. 154(b) by 730 days.

(21) Appl. No.: 10/369,229

(22) Filed: Feb. 19, 2003

(51) Int. Cl.
H04L 7/00 (2006.01)

(52) U.S. Cl. .................. 375/367; 375/136; 375/147; 375/316; 375/354; 375/130; 370/320; 370/335; 370/342; 370/441

(58) Field of Classification Search ................ 375/130, 375/136, 140, 145, 147, 149, 316, 354, 367, 375/369; 370/320, 335, 342, 441
See application file for complete search history.

(56) References Cited

U.S. PATENT DOCUMENTS

| | | | | |
|---|---|---|---|---|
| 4,225,935 A | * | 9/1980 | Zscheile et al. | 708/253 |
| 4,776,012 A | * | 10/1988 | Zscheile et al. | 380/46 |
| 5,022,049 A | * | 6/1991 | Abrahamson et al. | 375/130 |
| 5,463,627 A | * | 10/1995 | Matsuoka et al. | 370/350 |
| 5,598,154 A | * | 1/1997 | Wilson et al. | 341/50 |
| 5,619,504 A | * | 4/1997 | Van Grinsven et al. | 370/347 |
| 5,771,239 A | * | 6/1998 | Moroney et al. | 370/474 |
| 5,852,630 A | * | 12/1998 | Langberg et al. | 375/219 |
| 5,912,644 A | * | 6/1999 | Wang | 342/457 |
| 5,923,679 A | * | 7/1999 | Itoh et al. | 714/752 |
| 6,452,959 B1 | * | 9/2002 | McDonough | 375/130 |
| 6,556,942 B1 | * | 4/2003 | Smith | 702/150 |
| 6,713,006 B1 | * | 3/2004 | Redin Gorraiz | 264/154 |
| 6,735,606 B2 | * | 5/2004 | Terasawa et al. | 708/252 |
| 6,748,006 B1 | * | 6/2004 | McDonough et al. | 375/140 |
| 6,891,882 B1 | * | 5/2005 | Hosur et al. | 375/147 |
| 6,959,030 B1 | * | 10/2005 | Clark | 375/130 |
| 7,003,269 B2 | * | 2/2006 | Willenegger | 455/102 |
| 2002/0020623 A1 | * | 2/2002 | Speranza et al. | 204/228.5 |
| 2003/0072283 A1 | * | 4/2003 | Varshney et al. | 370/335 |
| 2003/0108085 A1 | * | 6/2003 | Keller et al. | 375/145 |
| 2003/0193914 A1 | * | 10/2003 | Lomp et al. | 370/335 |
| 2003/0214919 A1 | * | 11/2003 | Kilfoyle et al. | 370/315 |

* cited by examiner

Primary Examiner—Chieh M. Fan
Assistant Examiner—Siu M Lee
(74) Attorney, Agent, or Firm—Harrington & Smith, PC (57) ABSTRACT

A system and method for using Psuedo-Noise (PN) phase to determine frame start of a data frame is provided. The system and method includes at least two PN component codes, wherein the at least two PN component codes are relatively prime. A received PN composite encoded signal is correlated with at least one of the PN component codes and a frame start is determined. With reference to frame start at least one training sequence bit is located. The training bits may be overwritten on FEC encoded frame data such that a FEC decoder may be used to recover data overwritten by the training sequence bit(s).

23 Claims, 6 Drawing Sheets

SYSTEM AND METHOD FOR PREDICTIVE SYNCHRONIZATION FOR LOCATING INTERLEAVING FRAMES AND DEMODULATION TRAINING SEQUENCES

CROSS-REFERENCE TO RELATED APPLICATIONS

This application is related to copending U.S. application Ser. No. 10/014,058, filed Dec. 6, 2001. The disclosure of this Non-provisional patent Application is incorporated by reference herein in its entirety to the extent it does not conflict with the teachings presented herein.

This application is related to copending U.S. application Ser. No. 10/085,610, filed Feb. 26, 2002. The disclosure of this Non-provisional patent Application is incorporated by reference herein in its entirety to the extent it does not conflict with the teachings presented herein.

FIELD OF THE INVENTION

This invention relates generally to communications systems such as wireless data or telephone systems. More particularly, the invention relates to frame synchronization (sync) detection using pseudo-noise correlation.

BACKGROUND OF THE INVENTION

Spread spectrum (SS) systems, which may be CDMA systems, are well known in the art. SS systems can employ a transmission technique in which a pseudo-noise (PN) PN-code is used as a modulating waveform to spread the signal energy over a bandwidth much greater than the signal information bandwidth. At the receiver the signal is de-spread using a synchronized replica of the PN-code. The receiver can include an adaptive filter, such as one embodied in the form of a rake receiver, that is used for parallel correlation (acquisition) and multipath mitigation (tracking) of a received spread spectrum signal.

A variety of multiple access communication systems have been developed for transferring information among a large number of system users. Techniques employed by such multiple access communication systems include time division multiple access (TDMA), frequency division multiple access (FDMA), and AM modulation schemes, such as amplitude companded single sideband (ACSSB), the basics of which are well known in the art.

In Spread Spectrum (SS) or TDMA-SS transmission systems a succession of short-duration bursts emanating from a number of different stations are presented to a demodulator. Each burst may contain data frames from one or more data channels. Furthermore, the data frames may be interleaved data frames. Each data frame (interleaved or otherwise) generally contains a sync word used by the demodulator for frame synchronization purposes. In addition, one or more data frames may contain known bit patterns or training sequences used by the demodulator to improve the quality of reception. In general the location of these training sequences within a data frame are known in relation to the location of the sync word. It will be appreciated therefore that the sync word must be rapidly identified by the demodulator.

It should be noted that data frame synchronization is required as well in non-burst communication systems, such as continuous or substantially continuous transmission systems.

It can be appreciated that using sync words can result in certain disadvantages being realized. As examples, the use of sync words can: 1) require additional data bandwidth; 2) decrease available payload data space; 3) introduce a susceptibility of the sync word to corruption by noise or jamming, 4) introduce a potential for false synchronization; and 5) require some amount of additional time for a demodulator to search for and correlate with sync word.

Therefore, it is desirable to provide a system and method for rapid synchronization of a received signal, such as one containing data frames, and, when desired, the locating of bit patterns, such as training bits, in real time, or near real time, with respect to demodulator functions.

SUMMARY OF THE INVENTION

The foregoing and other problems are overcome, and other advantages are realized, in accordance with the presently preferred embodiments of these teachings.

In accordance with one embodiment of this invention, there is provided a receiver system for determining a start of a frame. The receiver system includes at least two receiver pseudo-noise (PN) component code generators adapted to generate at least two relatively prime PN component codes, respectively. The receiver also includes a frame counter adapted to locate frame start according to at least one of the receiver PN component codes.

In accordance with another embodiment of this invention, a method is provided for using Pseudo-Noise (PN) phase to determine the start of a data frame. The method includes providing at least two relatively prime PN component codes and correlating a received PN composite encoded signal with at least one of the PN component codes. The method also includes determining a frame start in accordance with at least one of the PN component codes correlated with the received PN composite encoded signal.

The teachings of this invention are also directed towards an integrated circuit (IC). The IC includes at least two receiver pseudo-noise (PN) component code generators, adapted to generate at least two relatively prime PN component codes, respectively. The IC also includes a frame counter, adapted to locate frame start according to at least one of the receiver PN component code generators.

In the presently preferred embodiment of this invention the IC can include, or is coupled to, at least one adaptive filter that is configurable for at least one of parallel correlation (acquisition) and multipath mitigation (tracking) of a received spread spectrum signal. The adaptive filter can be embodied in the form of a rake receiver.

The teachings of this invention are also directed towards a program storage device readable by a machine, tangibly embodying a program of instructions executable by the machine to perform method steps for using Psuedo-Noise (PN) phase to determine frame start of a data frame. The method includes providing at least two relatively prime PN component codes and correlating a received PN composite encoded signal with at least one of the PN component codes. The method also includes determining a frame start in accordance with the at least one of the PN component codes correlated with the received PN composite encoded signal and locating at least one training sequence bit in accordance with determining frame start. The method may also include forward error correction (FEC) decoding the data frame to recover data overwritten by the at least one training sequence bit.

BRIEF DESCRIPTION OF THE DRAWINGS

The foregoing aspects and other features of the present invention are explained in the following description, taken in connection with the accompanying drawings, wherein:

FIGS. 3A-3C, 3D2, and 3D1 are timing diagrams showing marker features of the present invention and the timing relationship data frames and training bits;

DETAILED DESCRIPTION OF THE PREFERRED EMBODIMENTS

Figure 1:
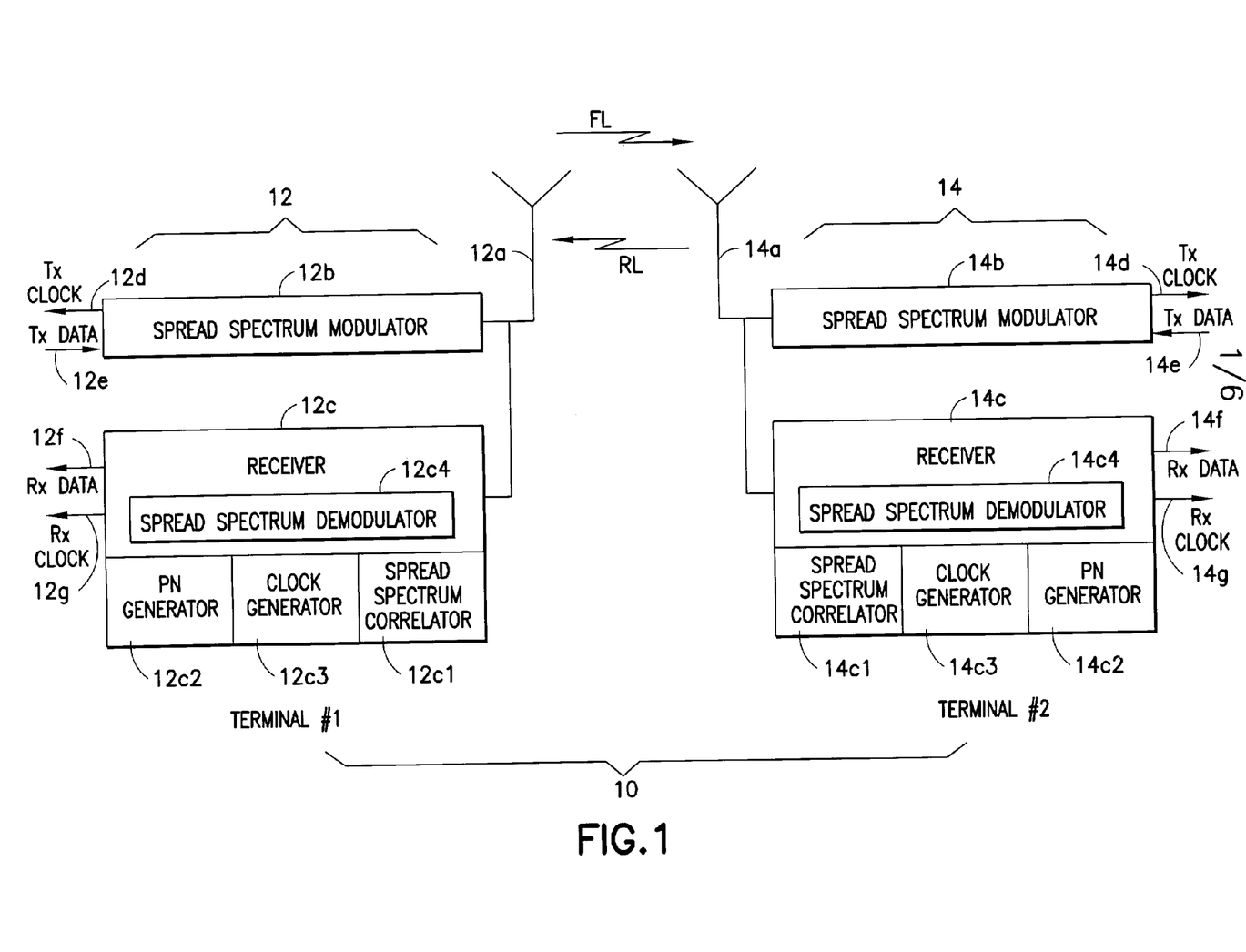
FIG. 1 is a pictorial diagram of a communication system having a transmitter and a receiver incorporating features of the present invention.

Referring to FIG. 1, there is shown a pictorial diagram of a telecommunications system incorporating features of the present invention. Although the present invention will be described with reference to the embodiments shown in the drawings, it should be understood that the present invention might be embodied in many alternate forms of embodiments, e.g., point-to-point simplex links, point-to-multipoint links, and either simplex or full-duplex links. In addition, it should be understood that the teachings herein may apply to any group or assembly of spread spectrum (SS) receivers, including those that are fixed in place; vehicle mounted; and/or hand carried.

Still referring to FIG. 1, there is shown a full-duplex system 10 that is suitable for practicing this invention. Specifically, the system 10 employs direct sequence spread spectrum based techniques over an air link to provide data transfer between Terminal #1 12 and Terminal #2 14. The forward link (FL) from Terminal #1 12 to Terminal #2 14 contains a spread spectrum waveform that is constructed in the manner described herein, with the PN code being composed of even-length and maximal length codes. In a similar manner, the return link (RL) from Terminal #2 14 to Terminal #1 12 contains a spread spectrum waveform that is similar or identical to that of the FL. It will be appreciated that an advantage of the present invention allows the data rates of the FL and RL to be changed synchronously and seamlessly at the transmit or receive (modulator and demodulator) ends of the link without the need for bit synchronizers.

FIG. 1 also shows Terminal #1 item 12 including a Spread Spectrum Modulator (SSM) 12b; the SSM 12b generates a desired spread spectrum waveform at a desired RF frequency. The SSM 12b also provides a Tx clock 12d that is used to clock the Tx Data 12e into the SSM 12b. The SSM 12b then combines the Tx data 12e with a spread spectrum PN code to produce the desired spread spectrum waveform. Terminal #1 12 also includes an antenna 12a, which may transmit at any suitable RF frequency.

The signal generated by Terminal #1 12 and transmitted by antenna 12a via the FL is received by Terminal #2 14 via antenna 14a to receiver 14c. Receiver 14c includes a spread spectrum correlator 14c1, PN generator 14c2, clock generator 14c3, and spread spectrum demodulator (SSD) 14c4. The received signal is then demodulated by SSD 14c4. Once the signal is acquired and the receiver 14c is tracking the received signal, the Rx Clock 14g and Rx Data 14f are output to the intended user. It will be appreciated that the data clocks 14g and 12d are synchronous and may be commanded to change frequency on the PN epochs; thus advantageously providing means to vary the data rate without interruption; and without the need for bit synchronizers to acquire and track at the new clock frequency with their associated loss of clock coherence between the transmitter and receiver.

Similarly, Terminal #2 14 generates a Tx Clock 14d and Tx Data 14e using the Spread Spectrum Modulator 14b in a similar fashion described earlier for Terminal #1. Likewise, Terminal #1 12 may receive the RL signal via antenna 12a, and demodulate and track the signal as described earlier with receiver 12c to provide Rx Data 12f and Rx Clock 12g to the intended user.

This invention provides a method and system for determining frame synchronization and subsequent training bits, if any, by using PN code information. The PN code may be an aggregate PN code or a subcomponent code. As used herein an aggregate PN is defined as an aggregate of at least two subcomponent PN codes. In the preferred embodiment, the aggregate PN code is constructed with at least three subcomponent PN codes. However, in alternate embodiments any suitable number of subcomponent PN codes may be used.

Figure 2:
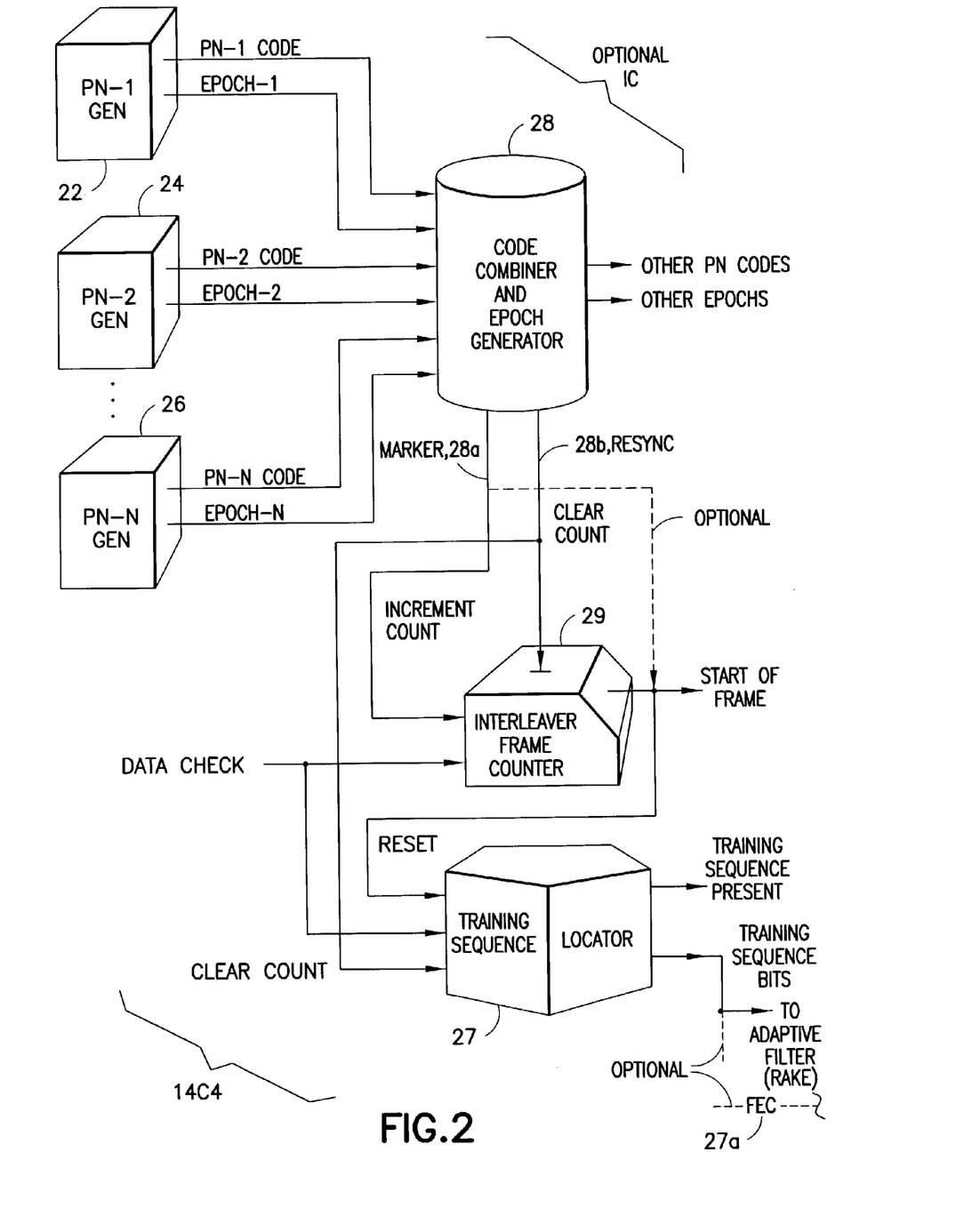
FIG. 2 is a block diagram of a demodulator shown in FIG. 1 incorporating features of the present invention.

It will be further understood that any suitable, relatively prime (i.e., PN component codes, PN-1, PN-2, PN-N, do not have the same prime multiplicand) may be selected. The following description describes one such method for selecting relatively prime PN codes. Referring to FIG. 2 there is shown a block diagram of the demodulator FIG. 1, item 14c4, incorporating features of the present invention. In this embodiment the PN-1 code generator 22 generates a binary $2^n$ PN code, where n=0, 1, 2, 3 . . . max. The PN-2 code generator 24 generates a maximal length code $2^m-1$, where m is an integer value=n. The PN-N code generator 26 generates any suitable, relatively prime PN code to be combined with the PN-1 and PN-2 codes in code combiner 28. Code combiner 28 may be any suitable code combiner such as a MAND code combiner, or a MAJ code combiner, as described in commonly assigned U.S. patent application Ser. No. 10/058,669, filed Jan. 28, 2002, entitled "System and Method for Generating and Acquiring Pseudo-Noise (PN) Spread Signals", Merle L. Keller et al. (U.S. Pat. No. 7,054,350), and incorporated by reference in its entirety. The code combiner 28 may further be constructed as a MOD code combiner, as described in commonly assigned U.S. patent application Ser. No. 10/352,295, filed Jan. 27, 2003, entitled "System and Method for Fast Data Rate Discovery from PN Codes", V. Mower et al., and incorporated by reference in its entirety.

It will be appreciated that the block functions shown in FIG. 2 may be functionally distributed or contained on one or more integrated circuits.

The PN code generators 22, 24 and 26 also generate an epoch signal corresponding to the start or restart of the respective PN code. The epoch of a component code occurs once per the length of the component code, and the epoch is customarily recognized as the all-ones state of the PN component code generator. The major epoch of a composite PNc code occurs once per the length of the composite code ($L_{PN-1} \times L_{PN-2} \times L_{PN-N} = L_{PN-1,PN-2,PN-N}$) and is recognized as the simultaneous occurrence of the all-ones state of each component code. A major epoch occurs once and only once per $L_{PN-1,PN-2,PN-N}$ if, and only if, composite PN codes are relatively prime as in a preferred embodiment of the present invention.

Code combiner 28 also generates a marker signal, line 28a, and re-sync signal, line 28b. The marker signal is selected to occur at a minor PN code epoch; where an epoch is defined to be the all ones state (or some other fixed state) of at least one PN code. The re-sync signal may be selected to occur at a major composite epoch or a minor composite epoch, where a composite epoch is the near simultaneous, all ones state, of two or more PN component codes.

Still referring to FIG. 2, the marker signal, line 28a and re-sync signal, line 28b are presented, in one embodiment, to an interleaver frame counter 29 to generate a start-of-frame signal. It will be appreciated that frame interleaving techniques are well known and need not be discussed here other than to note that an interleaved frame contains an integer number of markers (See FIG. 3C).

In non-interleaving embodiments, the marker signal, line 28a may be used to determine the start of a frame. Once frame start has been determined, the frame location of the training bits discussed above, if any, may be located by training sequence locator 27.

The training sequence locator block 27 receives the Resync and Start of Frame signals for synchronizing its operation. The data clock, synchronized to the Marker signal is provided to provide symbol timing. Based on these inputs, and using relatively simple circuitry such as counters and tables, this block produces Training Sequence Present and Training Sequence Bits (shown also in FIG. 3D1 and FIG. 3D2). The Training Sequence Present signal notifies the demodulator, such as demodulator 14c4 of FIG. 1, that the incoming bit is a training sequence bit, while the Training Sequence Bits signal provides the corresponding bit that has been locally stored. In that all of these outputs may be predicted, the information can be made to the available to the demodulator simultaneous with the demodulator receiving a training sequence bit from the incoming data signal link.

Figure 3A:
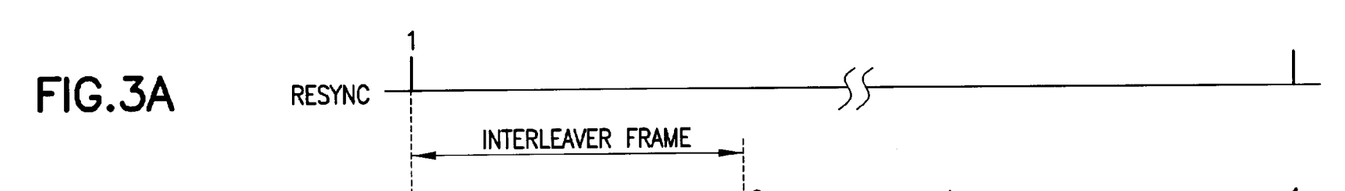

Referring to FIGS. 3A-3C, 3D1, and 3D2 there is shown an example timing relationship diagrams illustrating the marker and re-sync features of the present invention. FIG. 3D2 also shows an example of training bits dispersed among data frames. It will be appreciated that training bits may be used as control data to enhance demodulation or for any other suitable purpose where information must be quickly determined by the receiver. The training sequence in this interleaver frame example is located at a position in time that is determined in advance and distributed to receiver 14c. In this case, it starts with the 4th marker signal in the first interleaver frame after a re-sync signal and lasts for 300 bits. A space is reserved for this or another training sequence in every odd interleaver frame. It will be appreciated that the training bits shown in FIGS. 3D1 and 3D2 need not appear in every frame (or interleaver frame in an interleaver embodiment).

Figure 3B:
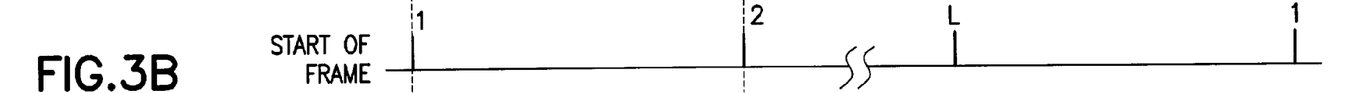
Figure 3C:
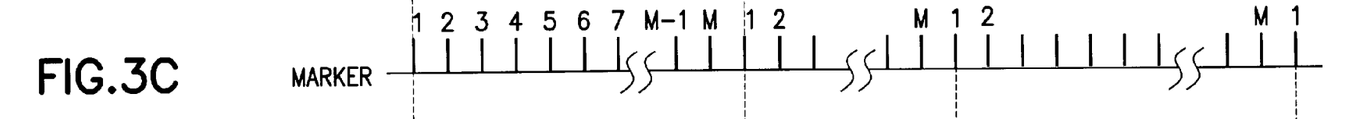
Figure 3D:
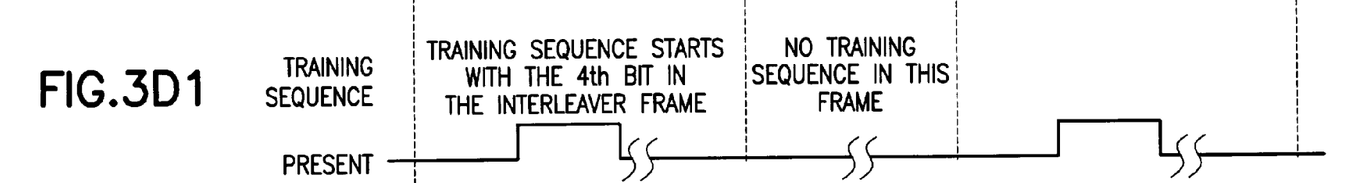
Figure 3D:
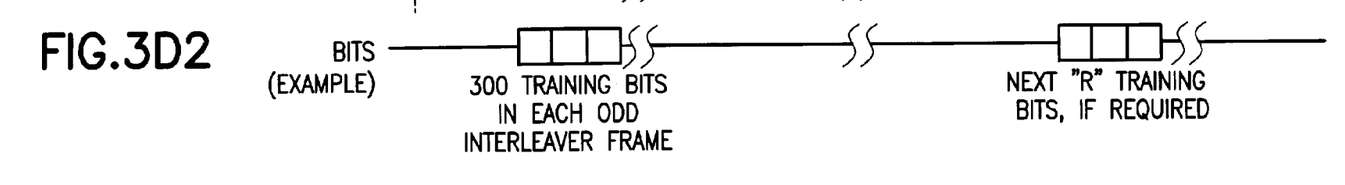

FIGS. 3A-3C also show start-of-frame signal is formed by counting the number of symbols in an interleaved frame using a symbol clock (not shown) and Marker signal shown in FIG. 3C. The resync signal, FIG. 3A, specifies the first interleaver frame and its period marks L interleaving frames, where L is a positive integer.

Figure 6:
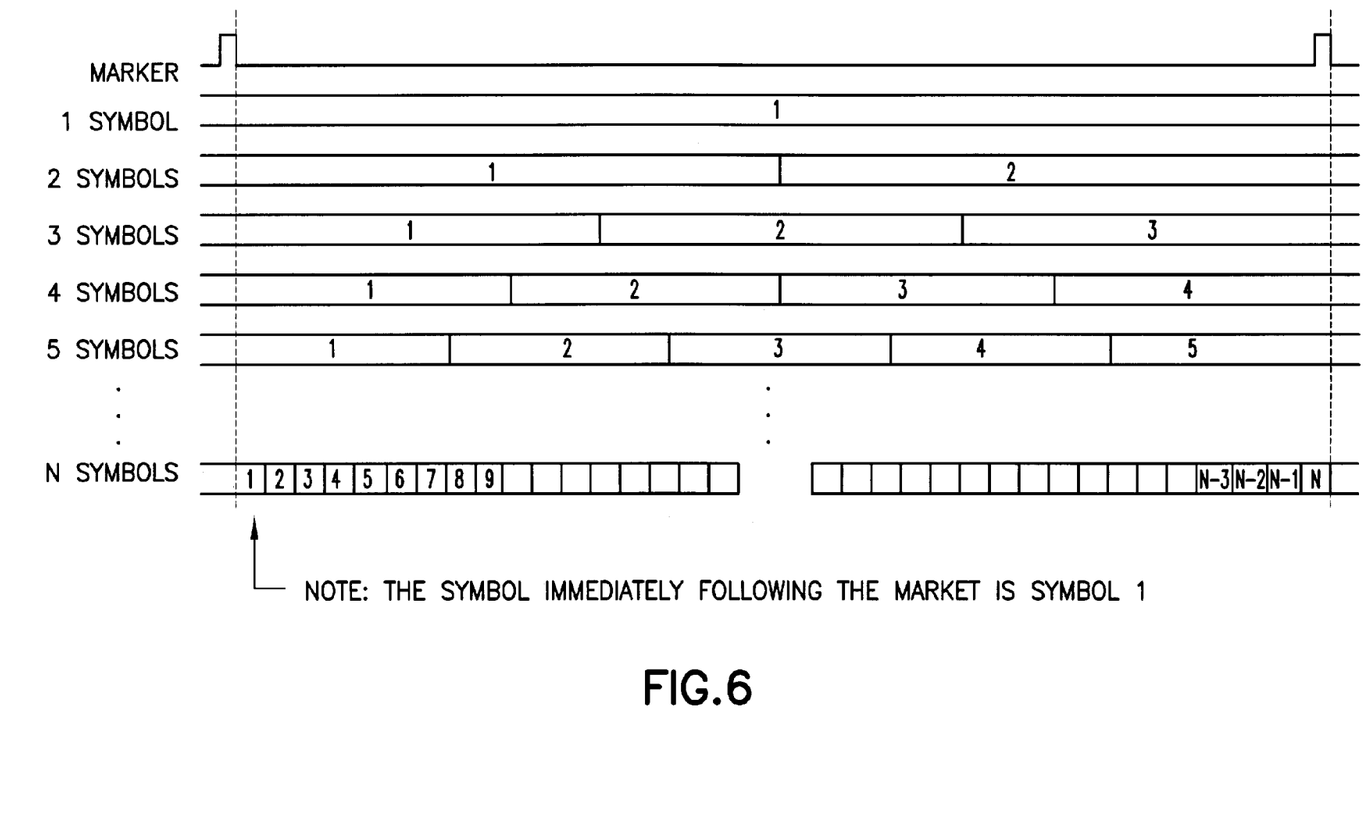
FIG. 6 is a relational diagram illustrating relationships between a marker signal and symbol rates in accordance with features of the present invention.

In a variable-rate embodiment, FIG. 6 shows that the relationship between a marker one or more symbol rates. In the example illustrated in FIG. 6, there may be 1 to N symbols, where N is an integer number, (or data bits) between each marker.

Figure 4:
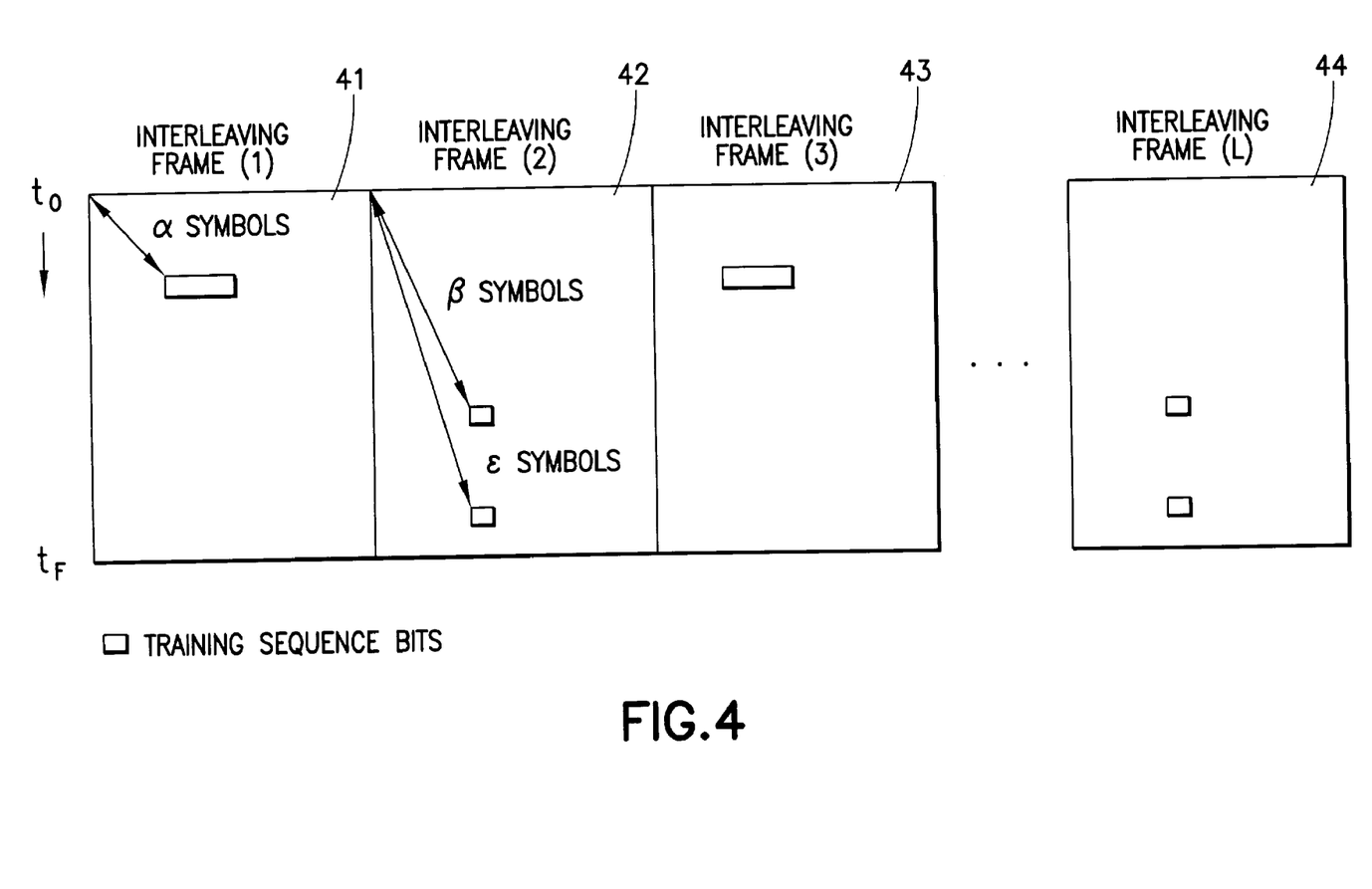
FIG. 4 is an example of training bits distributed across several frames in accordance with feature of the present invention.

Referring to FIG. 4 there is shown an example of training bits distributed across several frames in accordance with feature of the present invention. In this example, a first segment of the training signal appears in the first interleaved frame 41, referred to in FIG. 4 as the $\alpha$-symbols, which may be repeated in subsequent odd-numbered frames 43. The next frame 42 (and other even frames) has two sets of symbols ($\beta$-symbols and $\epsilon$-symbols), both of which are at a different position in time relative to the start of the frame $t_0$ than are the $\alpha$-symbols. The delta value $\epsilon$ may also be the number of symbols from the last training sequence bit of the previous block. Stated another way, block positions are specified by delta symbols. Of particular significance is the ability to relate at least one block in an interleaving frame to the start of the frame. Once the block is located the number of training sequence bits that are contained in that block can be counted.

This embodiment may be used to test for a timing shift over the course of a frame. Preferably, the receiving system 14c1 includes an error-corrector 27A, such as forward error correction (FEC), and the length of the training sequence (or the distributed training bits) is within the capability of the error correction. This allows the training sequence to be written over ordinary data, with the FEC being used to recoverer the over-written data.

Figure 5:
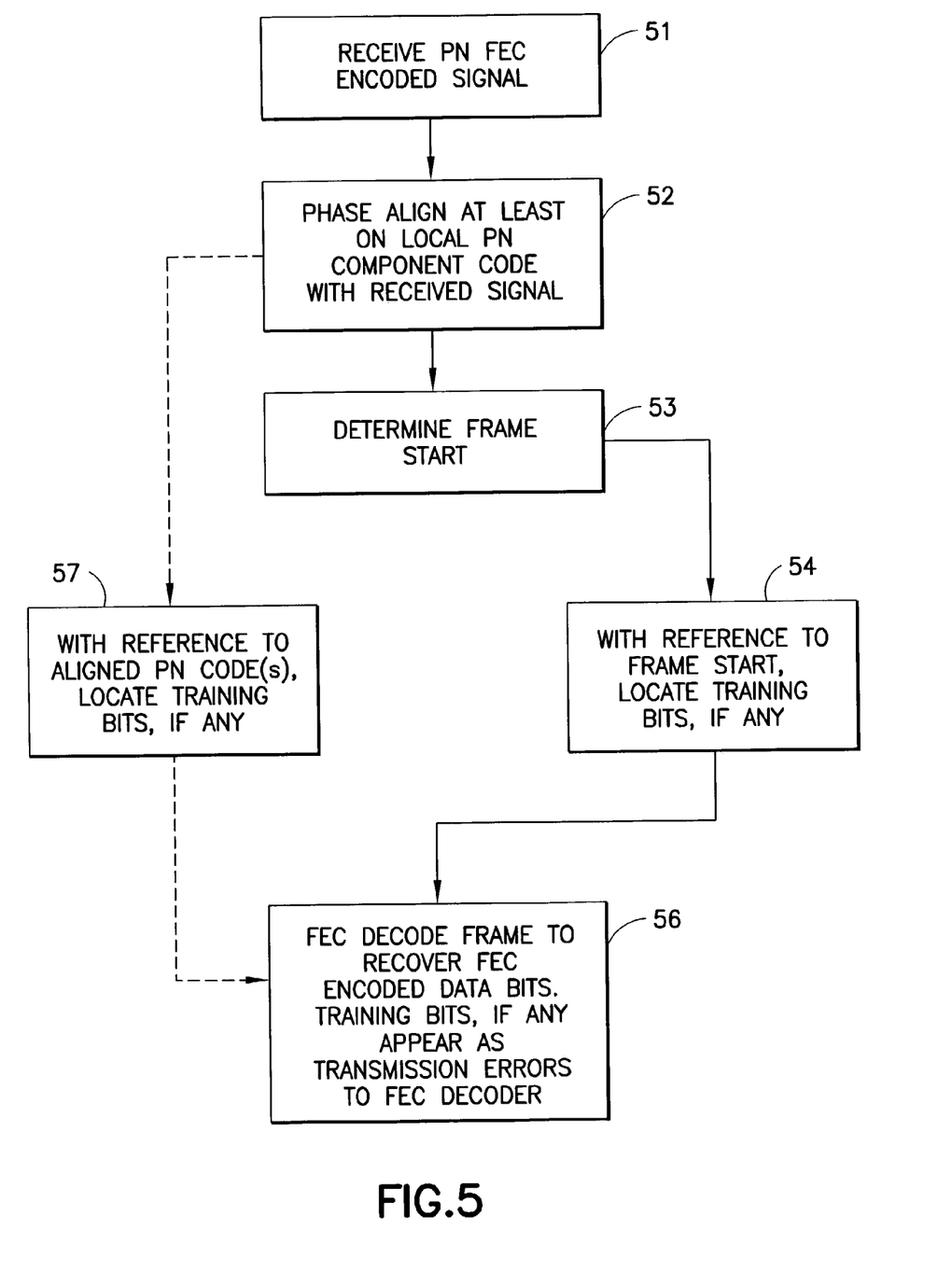
FIG. 5 is a method flow chart showing steps for one implementing one embodiment of the present invention.

Referring to FIG. 5, there is shown one method for determining the location of training sequence data in accordance with features of the present invention. Step 51 receives a PN encoded signal where the data, with the exception of Training Bits, are FEC encoded. Step 52 phase aligns the received PN FEC encoded signal with at least one local PN component code. Step 53 uses an epoch of the phase aligned PN component code to determine frame start. In alternate embodiments Step 53 could use a composite epoch such as the minor or major epochs described above. From frame start, step 54 locates Training bits (i.e. control bits). Step 56 FEC decodes data frame to recover FEC encoded data. Data overwritten by Training bits appear as transmission errors to FEC decoder. It will be understood that FEC decoders have limits on the number of transmission errors that may be corrected, and that the number of training bits are suitably selected to be within these limits.

In alternate embodiments step 57 locates training bits with reference to aligned PN code(s).

It should be noted that these teachings may also be employed with systems that use TDMA waveforms, where a well defined framing structure is inherently present in the waveform. In this case the training sequence can take advantage of the slot timing, used at each end of the link to synchronize the time slot usage without requiring other reference points. In addition, the training sequence can be positioned within the preamble section of the slot, thereby avoiding a reduction in the size of the data payload or the corruption of the data payload.

The foregoing technique enables the receiver terminal of a DSSS waveform to locate and synchronize with an interleaving frame structure embedded within the incoming data stream, without the use of traditional synchronization codes and dedicated bit synchronizers. Once the interleaving frame is revealed, the training sequence, if present, can be predicted and forwarded to the demodulator such that all of the information can be processed in substantially real time.

With regard to channel estimation using a training sequence, estimates of the system parameters may be found by applying results of linear estimation theory to extract the magnitude and phase response of the wireless channel. These estimated parameters are used to track the time-varying wireless channel.

This embodiment creates parallel channels from the high-rate serial input data stream. The linear algebraic based signal processing algorithms are then applied at a divided clock rate. This structure creates a linear system model that is viewed as a multiple-input-multiple-output (MIMO) model with a diagonal matrix channel model. The elements of the diagonal matrix channel model are sequentially accessed to form a single sequence of channel states for the single high-rate wireless channel.

The diagonal matrix channel is estimated by finding the Best Linear Unbiased Estimator (BLUE), when known (approximately) orthogonal PN sequences are used in conjunction with a distributed known data sequence. The combination of the PN spreading codes and the known data symbols embedded at dispersed times in the waveform is the "training sequence" used to gain initial channel states. Once the parameter estimation algorithm has converged, the decoded data symbols are used in the estimation algorithm for providing an adaptive tracking loop.

It should be noted that those receivers that do not have the capability to use the embedded training sequence still have the ability to access the waveform, when suitable channel conditions exist.

This invention provides a method of recovering interleaver framing without the use of transmitted frame sync codes and external bit/symbol synchronizers. This is accomplished by establishing a unique relationship between a transmitted data rate (bit or symbol), component PN code length, PN code rate, and a desired interleaver size. The use of synchronizing signals (Marker, Start of Frame, Resync, etc.), typically associated with PN code epochs, coordinate the different functions and establish an initialization.

These techniques can be applied, for example, to variable rate systems where the rates are known a priori, and where an integer relationship exists between all rates within a defined set of rates.

These techniques may also be applied to data rate-PN code relationships that are not strictly binary, i.e., where integers other than two may be present as prime numbers.

The "Marker" signal, which determines the minimum number of bits/symbols in a single PN code cycle, can be derived from one or more component PN codes that when combined form a unique, composite, PN code cycle that can be initialized using a "Resync" signal.

By establishing the interleaver framing, the location of a predefined training sequence within an interleaves frame can be predicted. The training sequence need not be present in every frame, and the entire sequence can be distributed across a plurality of frames thereby limiting the number of errors that occur in any one frame. A signal marking the location can then be sent to the demodulator so that it is time aligned with the received training sequence for immediate use by the demodulator.

Note further that the relationship between the various component PN code generators forming the DSSS waveform and the desired set of data rates, need not utilize all PN code generators to form the set of unique signals that specify the position of the interleaver frame and the location of any desired training sequence. The teachings of this invention can be applied equally well to BPSK, QPSK, O-QPSK, bi-BPSK, and other waveforms.

Based on the foregoing, then, it should be appreciated that various modifications can be made to these teachings without departing from the scope of this invention. For example, the demodulator 14c4 shown in FIG. 2 may be implemented in an integrated circuit (IC), such as firmware or application specific ICs (ASICs). The operation of the ICs or firmware may be defined by a suitable programming language such as a Very High Speed Integrated Circuit (VHSIC) Hardware Description Language (VHDL) file.

It should be appreciated that through the use of this invention the training sequence may be as little as one symbol, provided the SNR is adequate. Further, the length of the training sequence can be made adaptive in response to channel requirements. Furthermore, the training sequence may be eliminated altogether, for example, non-MMSE receivers can also access the waveform.

Accordingly, the present invention is intended to embrace all such alternatives, modifications and variances that fall within the scope of the appended claims.

What is claimed is:

1. A receiver system for determining frame start, the receiver system comprising:
    a receiver, the receiver adapted to receive signals from a transmitter, the receiver comprising:
    at least two receiver pseudo-noise (PN) component code generators, wherein the at least two PN component code generators are adapted to generate at least two relatively prime PN component codes, respectively; and
    a frame counter, wherein the frame counter is adapted to locate frame start according to a minor PN code epoch of at least one of the at least two relatively prime PN component codes.

2. A receiver system as in claim 1 wherein the frame counter is an interleaver frame counter.

3. A receiver system as in claim 2 further comprising a training sequence locator coupled to the frame counter.

4. A receiver system as in claim 1 wherein the receiver system further comprises a receiver logic combiner coupled to the at least two receiver PN component code generators, the receiver logic combiner adapted to generate at least one composite PN code; at least one marker signal; and at least one resync signal.

5. A receiver system as in claim 4 wherein the at least one marker signal comprises at least one minor PN code epoch, wherein the at least one minor PN code epoch comprises an all ones state of at least one of the relatively prime PN component codes.

6. A receiver system as in claim 4 wherein the at least one resync signal comprises a PN major epoch, wherein the PN major epoch comprises an all ones state of at least two of the relatively prime PN component codes.

7. A receiver system as in claim 4, where the logic combiner comprises one of a MAND logic combiner, a MAJ logic combiner and a MOD logic combiner.

8. A receiver system as in claim 4, further comprising a forward error correction (FEC) decoder coupled to a training sequence locator.

9. A receiver system as in claim 8, where said FEC decoder corrects data overwritten by at least one training bit.

10. A method for using Psuedo-Noise (PN) phase to determine frame start of a data frame, the method comprising:
    providing at least two PN component codes, wherein the at least two PN component codes are relatively prime;
    correlating a received PN composite encoded signal with at least one of the PN component codes; and
    determining a frame start in accordance with a minor PN code epoch of at least one of the PN component codes correlated with the received PN composite encoded signal.

11. A method as in claim 10 wherein determining the frame start in accordance with the at least one of the PN component codes correlated with the received PN composite encoded signal further comprises:
    determining at least one PN code epoch; and
    generating a start-of-frame marker in accordance with determining the at least one PN epoch.

12. A method as in claim 11 wherein determining the at least one PN epoch further comprises determining at least one minor PN code epoch.

13. A method as in claim 11 wherein determining the at least one PN epoch further comprises determining at least one PN code major epoch.

14. A method as in claim 11 wherein generating the start-of-frame marker further comprises generating a start-of-interleaver-frame marker.

15. A method for using Psuedo-Noise (PN) phase to determine frame start of a data frame, the method comprising:
providing at least two PN component codes, wherein the at least two PN component codes are relatively prime;
correlating a received PN composite encoded signal with at least one of the PN component codes; and
determining a frame start in accordance with the at least one of the PN component codes correlated with the received PN composite encoded signal further comprising:
determining at least one PN code epoch;
generating a start-of-frame marker in accordance with determining the at least one PN epoch; and
locating at least one training sequence bit in accordance with generating the start-of-frame marker.

16. A method for using Psuedo-Noise (PN) phase to determine frame start of a data frame, the method comprising:
providing at least two PN component codes, wherein the at least two PN component codes are relatively prime;
correlating a received PN composite encoded signal with at least one of the PN component codes; and
determining a frame start in accordance with the at least one of the PN component codes correlated
with the received PN composite encoded signal further comprising:
determining at least one PN code epoch;
generating a start-of-frame marker in accordance with determining the at least one PN epoch;
locating at least one training sequence bit in accordance with generating the start-of-frame marker; and
forward error correction (FEC) decoding the data frame to recover data overwritten by the at least one training sequence bit.

17. An integrated circuit (IC), wherein the IC comprises:
at least two receiver pseudo-noise (PN) component code generators, wherein the at least two PN component code generators are adapted to generate at least two relatively prime PN component codes, respectively; and
a frame counter, wherein the frame counter is adapted to locate frame start according to a minor PN code epoch of at least one of the at least two receiver PN component code generators.

18. An IC as in claim 17 wherein the IC further comprises a receiver logic combiner adapted to generate a receiver composite PN code.

19. An IC as in claim 18, where the logic combiner comprises one of a MAND logic combiner, a MAJ logic combiner and a MOD logic combiner.

20. An IC as in claim 17, where the IC comprises an Application Specific IC (ASIC).

21. An IC as in claim 17, where the IC comprises a field programmable gate array (FPGA).

22. A storage device tangibly embodying a program of instructions, readable by a machine, and executable by the machine to perform method steps for using Psuedo-Noise (PN) phase to determine frame start of a data frame, the method comprising:
providing at least two PN component codes, wherein the at least two PN component codes are relatively prime;
correlating a received PN composite encoded signal with at least one of the PN component codes;
determining a frame start in accordance with a minor PN code epoch of the at least one of the PN component codes correlated with the received PN composite encoded signal;
locating at least one training sequence bit in accordance with determining the frame start; and
forward error correction (FEC) decoding the data frame to recover data overwritten by the at least one training sequence bit.

23. The storage device tangibly embodying the program of instructions executable by the machine as in claim 22, where the program of instructions comprise at least one Very High Speed Integrated Circuit (VHSIC) Hardware Description Language (VHDL) file.

* * * * *